United States Patent [19]

Anhegger

[11] 4,444,333
[45] Apr. 24, 1984

[54] DEVICE FOR THE VENTILATION OF A FUEL TANK, PARTICULARLY FOR A MOTOR VEHICLE

[75] Inventor: Sigmund Anhegger, Renningen, Fed. Rep. of Germany

[73] Assignee: Dr. Ing. h.c.F. Porsche A.G., Stuttgart, Fed. Rep. of Germany

[21] Appl. No.: 368,660

[22] Filed: Apr. 15, 1982

[30] Foreign Application Priority Data

May 2, 1981 [DE] Fed. Rep. of Germany ....... 3117380

[51] Int. Cl.³ .............................................. B65D 25/00
[52] U.S. Cl. .................................. 220/85 S; 137/587; 220/86 R
[58] Field of Search ............... 220/86 R, 85 S, 85 VS, 220/85 VR; 137/38, 587, 590, 593; 280/5 A, 5 R; 244/135 R

[56] References Cited

U.S. PATENT DOCUMENTS

| | | | |
|---|---|---|---|
| 3,390,698 | 7/1968 | Carmichael et al. | 137/590 X |
| 3,542,239 | 11/1970 | Latuala | 220/85 V |
| 3,817,421 | 6/1974 | Andres | 220/86 R X |

*Primary Examiner*—Allan N. Shoap
*Attorney, Agent, or Firm*—Craig & Burns

[57] ABSTRACT

In the interior of a fuel tank, a device is provided for its ventilation, comprising ventilation pipes, which run in a transverse direction relative to the vehicle in which the tank is mounted, and whose intake ports are disposed adjacent to opposite, vertical boundary walls of the fuel tank. In order for the ventilation device to be simple to produce, have a low overall height and function good, the ventilation pipes have different diameters. A first ventilation pipe has forked pipe sections, one of which is surrounded by a second ventilation pipe of a larger diameter in such a way that their intake ports are provided at the free ends of the ventilation pipes that are disposed near opposite lateral boundary walls of the fuel tank.

8 Claims, 5 Drawing Figures

DEVICE FOR THE VENTILATION OF A FUEL TANK, PARTICULARLY FOR A MOTOR VEHICLE

BACKGROUND AND SUMMARY OF THE INVENTION

The present invention relates to a device for the ventilation of a fuel tank, and particularly for a motor vehicle, which in the interior of the tank is comprised of ventilation pipes, which run in a transverse direction to the vehicle, and whose inlet ports are disposed adjacent to opposite, vertical boundary walls of the fuel tank.

It has been proposed in another, conventional device of the aforementioned type German Auslegeschrift 2,045,004 that a duct section of the ventilation pipe running along the upper tank wall be provided with a bend on both its opposite ends which connect to pipe sections which point toward opposite boundary walls, and whose free ends have inlet ports. In the center area, the duct section is connected to an exit pipe penetrating the upper tank wall and running approximately perpendicular to the duct section. However, a disadvantage of this proposed arrangement resides in the fact that two bending processes of different bending radii are required for the production of the ventilation pipe necessitating the use of expensive tools. Furthermore, for the connection of the upper duct section to the exit pipe, time and cost intensive drilling and soldering processes must be performed. A further disadvantage resides in the fact that the bends cause the overall height to be relatively large, and that the two ventilation ducts are arranged at different heights of the fuel tank. This impairs optimum filling of the fuel tank.

A principle object underlying the present invention, therefore, is to create a device for the ventilation of a fuel tank, which, besides functioning well, is simple to produce and exhibits a small overall height.

This object is attained, according to a preferred embodiment of the present invention, by the use of ventilation pipes having different diameters, a pipe of smaller diameter having forked sections and being surrounded by a second pipe of larger diameter, in such a manner that free ends of the pipes provide intake ports at opposite lateral sides of the tank.

The primary advantages attained by the present invention reside in the fact that the interlocking of the two ventilation pipes makes it possible to use components that are simple to produce and, at the same time, assures good functioning. Furthermore, the device has a low overall height, and the connection of the pipe section with the exit pipe is achieved in a simple way.

These and further objects, features and advantages of the present invention will become more obvious from the following description when taken in connection with the accompanying drawings which show, for purposes of illustration only, several embodiments in accordance with the present invention.

DETAILED DESCRIPTION OF PREFERRED EMBODIMENTS

Figure 1:
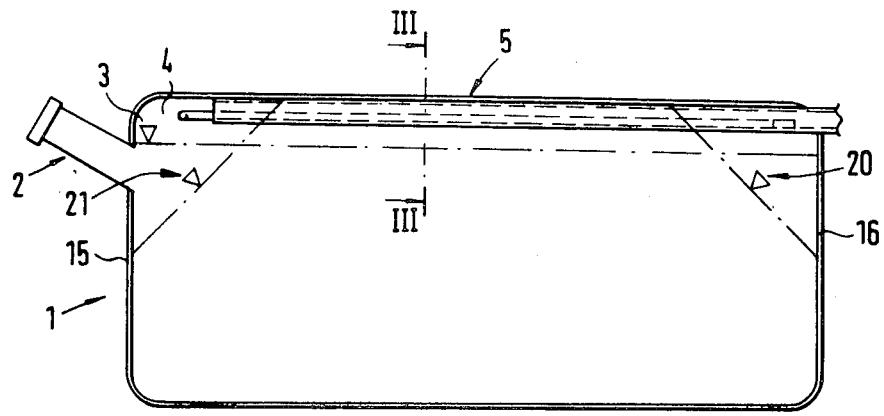
FIG. 1 is a vertical sectional view of a fuel tank with the ventilation device according to the present invention, taken along line I—I in FIG. 2.
Figure 2:
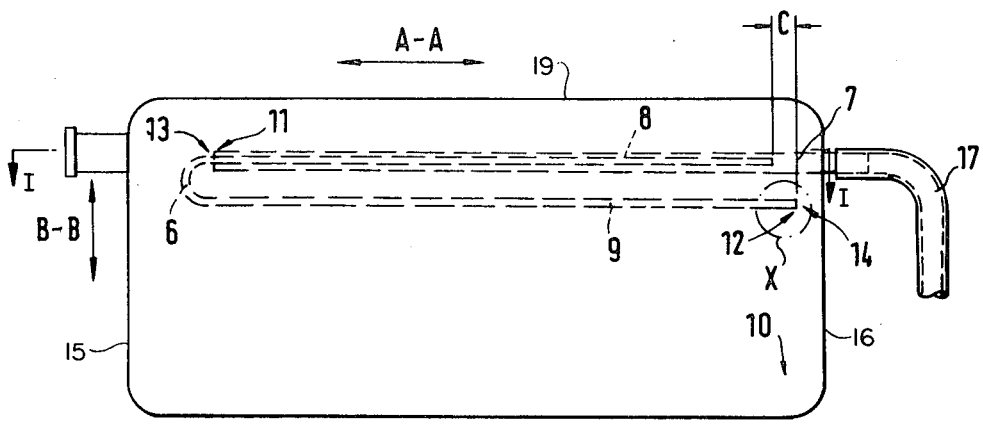
FIG. 2 is a top view of the fuel tank.
Figure 5:
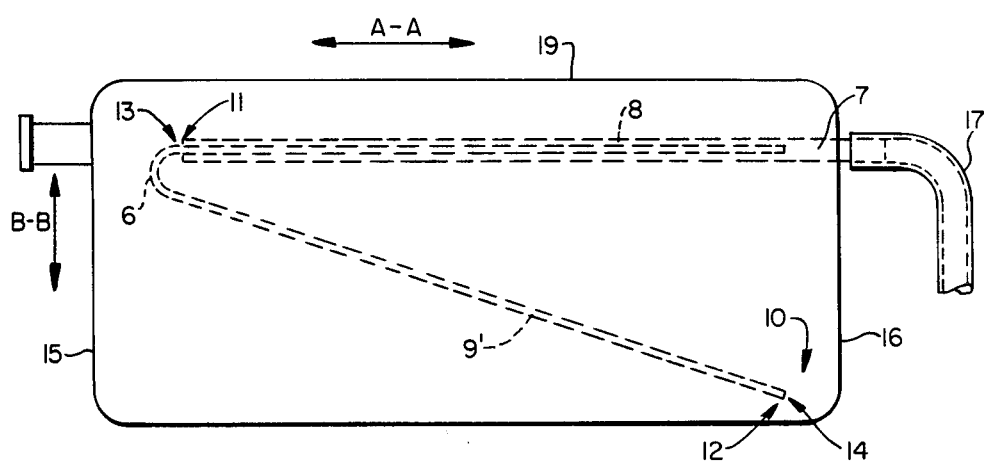
FIG. 5 is an enlarged sectional view taken along the line III—III in FIG. 1 showing a modified embodiment of the invention.

FIG. 1 shows a fuel tank 1 with a filler spout 2, which determines the highest fuel level 3. Above the fuel level 3, a device 5 for ventilation is provided in the interior 4 of the fuel tank 1. The device 5 ensures adequate ventilation of the fuel tank 1 during banking and lateral acceleration, for example, during turning operations. Device 5 comprises two ventilation pipes 6, 7 of different diameters which run in a transverse direction A—A relative to the vehicle. The first ventilation pipe 6, which is smaller in diameter, has forked pipe sections 8, 9, which are in a parallel relationship with respect to each other (FIG. 2). It is, however, possible, in accordance with a modified embodiment, to arrange the two pipe sections 8, 9 at an acute angle, so that a pipe section 9' runs approximately diagonally to the corner 10 of the fuel tank 1 (FIG. 5). Thereby, in the banking position of the fuel tank, wherein the tank is shifted in the direction of arrows B—B, and, during acceleration or braking, sufficient ventilation is assured.

The pipe section 8 is surrounded by a second ventilation pipe 7, which has a larger diameter than pipe 6, in such a way that the intake ports 13, 14 are disposed at the free ends 11, 12 of the ventilation pipes 6, 7, adjacent to opposite vertical boundary walls 15, 16.

The second ventilation pipe 7 penetrates the boundary wall 16 of the fuel tank 1, and is connected by means of hose clamps to an outlet pipe 17, outside of the fuel tank, which leads to a surge tank that is not shown in the drawing.

An advantageous embodiment of the present invention results from the fact that the pipe section 9 or 9', which is disposed outside of the second ventilation pipe 7, exceeds the other pipe section 8 in length by the dimension C. This feature prevents fuel from being drawn off by the ventilation pipes 6 and/or 7, through the outlet pipe 17, from the tank 1 in banked positions thereof, where fuel levels such as 20, 21 are assumed. The dimension C may be established experimentally for the respective types of fuel tanks.

The ventilation pipes 6, 7 are dimensioned such that the cross-sectional area of the first ventilation pipe 6, formed by its internal diameter $d_i$, corresponds approximately to the effective transverse sectional area formed by the difference between the external diameter $d_a$ of the first ventilation pipe 6 and the internal diameter $D_i$ of the second ventilation pipe 7.

Figure 4:
FIG. 4 is an enlarged detail X of FIG. 2.

For the purpose of achieving a good air flow for the ventilation, the ventilation pipes 6, 7 are provided with an internal chamfer 18 at the intake ports 13, 14 (FIG. 4).

Figure 3:
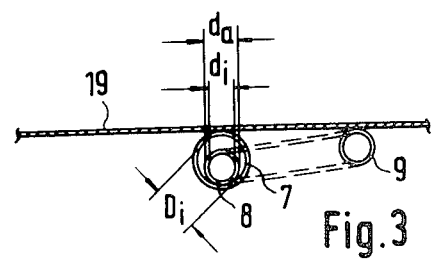
FIG. 3 is an enlarged sectional view taken along Line III—III in FIG. 1.

The manner of mounting of pipes 7, 8 can be seen with reference to FIG. 3. The second ventilation pipe 7 is kept in place at the upper tank wall 19 by soldering or other, not illustrated, fastening elements. The pipe section 8 of the first ventilation pipe 6 is disposed in such a way that it supports itself in the second ventilation pipe 7. The other pipe section 9 is fastened to the upper tank wall 19 by soldering or fasteners, if necessary.

When a vehicle in which the fuel tank is mounted executes a right turn, fuel level 20 may occur causing part of the fuel to enter, via intake port 13, into the ventilation pipe 7. If this occurs, ventilation is provided via intake port 14 and ventilation pipe 6, and, as noted above, a siphoning effect through pipe 6 is prevented due to the disposition of the outlet port, of pipe section 8, being displaced by the distance C relative to the intake port 14 of section 9 or 9'. Similarly, when the vehicle performs a left turn, a fuel level 21 might occur and venting would then occur directly via pipe 7, which would have its intake port 13 located in the air space above fuel level 21.

While I have shown and described various embodiments in accordance with the present invention, it is understood that the same is not limited thereto, but is susceptible of numerous changes and modifications as known to those skilled in the art and I, therefore, do not wish to be limited to the details shown and described herein, but intend to cover all such changes and modifications as are encompassed by the scope of the appended claims.

I claim:

1. A device for the ventilation of a fuel tank, particularly for a motor vehicle, comprising at least two ventilation pipes which are disposed within a fuel tank in a manner extending in a transverse direction relative to an intended orientation of the fuel tank within a vehicle, said ventilation pipes having a free end and an end adjacent to an outlet pipe, one of the ends adjacent the outlet pipe connected thereto, said ventilation pipes having intake ports which are respectively disposed on the free ends of the ventilation pipes adjacent to opposite, lateral vertical boundary walls of the fuel tank, wherein said ventilation pipes comprise a first and a a second ventilation pipe, said second ventilation pipe being larger in diameter than said first ventilation pipe, the first ventilation pipe having forked pipe sections, one of which is surrounded by said second ventilation pipe, and another of which is disposed outside of the second pipe.

2. The device defined in claim 1, wherein the forked pipe sections of the first ventilation pipe extend approximately parallel to each other.

3. The device according to claim 2, wherein the pipe section which is disposed outside of the second ventilation pipe, when seen in a top view, is longer than the pipe section surrounded by the second ventilation pipe.

4. The device defined in claim 1, wherein the pipe section disposed outside of the second ventilation pipe extends approximately diagonally to a corner of the fuel tank.

5. The device defined in claim 4, wherein the pipe section disposed outside of the second ventilation pipe extends closer to its adjacent one of said vertical boundary walls than the pipe section surrounded by the second ventilation pipe.

6. The device defined in claim 1 or 3 or 5, wherein the cross sectional area of the first ventilation pipe approximately corresponds to the transverse sectional area formed between the external diameter of the first ventilation pipe and the internal diameter of the second ventilation pipe.

7. The device defined in claim 1 or 3 or 5, wherein said intake ports of the ventilation pipes are provided with chamfers.

8. The device for the ventilation of a fuel tank according to claim 1 wherein the second ventilation pipe is concentrically disposed about the first ventilation pipe.

* * * * *